United States Patent [19]

Latta, Jr.

[11] 4,339,744
[45] Jul. 13, 1982

[54] SCHOOL BUS STOP SIGN

[76] Inventor: Joseph E. Latta, Jr., Rte. 4, Box 56A, Hillsborough, N.C. 27278

[21] Appl. No.: 249,110

[22] Filed: Mar. 30, 1981

[51] Int. Cl.³ .............................................. B60Q 1/46
[52] U.S. Cl. ................................. 340/133; 340/81 R; 116/63 R
[58] Field of Search .............. 340/130, 83, 133, 81 R, 340/142, 107, 127, 129, 120; 116/63 R

[56] References Cited

U.S. PATENT DOCUMENTS 4,138,668  2/1979  Latta, Jr. ............................. 340/130

*Primary Examiner*—Donald J. Yusko
*Attorney, Agent, or Firm*—B. B. Olive

[57] ABSTRACT

An electrically powered school bus sign apparatus mounts on the school bus body. A unidirectional DC motor and associated linkage and limit switch controls are used to deploy and retract the stop sign blade.

2 Claims, 3 Drawing Figures

SCHOOL BUS STOP SIGN

TECHNICAL FIELD

The invention relates generally to apparatus for deploying a sign. More particularly, the invention relates to an apparatus for electromechanically deploying a school bus stop sign.

BACKGROUND ART

A comprehensive review of the prior art is to be found in applicant's prior U.S. Pat. No. 4,138,668 which will therefore not be repeated.

Applicant's prior U.S. Pat. No. 4,138,668 teaches an electrically operated school bus stop sign which has proven in practice to offer many advantages over the conventional pneumatic system. The present invention will be noted as basically following the same electromechanical construction. However, with continued experience and use of the improved school bus sign taught by applicant's prior patent, applicant has discovered a wiring configuration which offers still further improvements over all known prior art as well as over applicant's prior patent. Thus, the principal object of the present invention is to improve the school bus stop sign construction taught by applicant's prior patent and specifically with reference to providing an improved electrical system adapted to use of a uni-directional mode of operation as compared to the bidirectional motor and bidirectional mode of operation employed in the school bus sign of applicant's prior patent.

DISCLOSURE OF INVENTION

The school bus stop sign of the present invention basically follows the construction described in applicant's prior U.S. Pat. No. 4,138,668 and which may be referred to for reference. As in the school bus stop sign of the prior patent, there is provided an actuating mechanism located in a housing and connecting a DC drive motor to the sign. The primary distinction of the present invention is that the actuating mechanism is arranged in conjunction with the wiring circuit such that a rotatable arm driven by the shaft of the drive motor moves the sign in and out through a connecting rod and actuates a pair of limit switches as the motor shaft always turns in the same direction. By comparison, the motor and actuating mechanism was required to reverse direction of rotation by the limit switch and wiring arrangement of the prior patent in order to deploy and retract the sign. The school bus stop sign of the present invention thus substantially reduces the amount of wiring required, the complexity of the wiring terminals and provides for an easier installed system. As an adjunct to the modified and improved wiring arrangement, the invention also provides for housing the flasher unit in the housing in which the sign actuating mechanism is employed. This arrangement also provides for improved maintenance and a more self-contained system.

BEST MODE FOR CARRYING OUT THE INVENTION

Details of the school bus stop sign construction described in applicant's prior U.S. Pat. No. 4,138,668 will be given along with a description of the improved circuitry and operation of the present invention.

Figure 1:
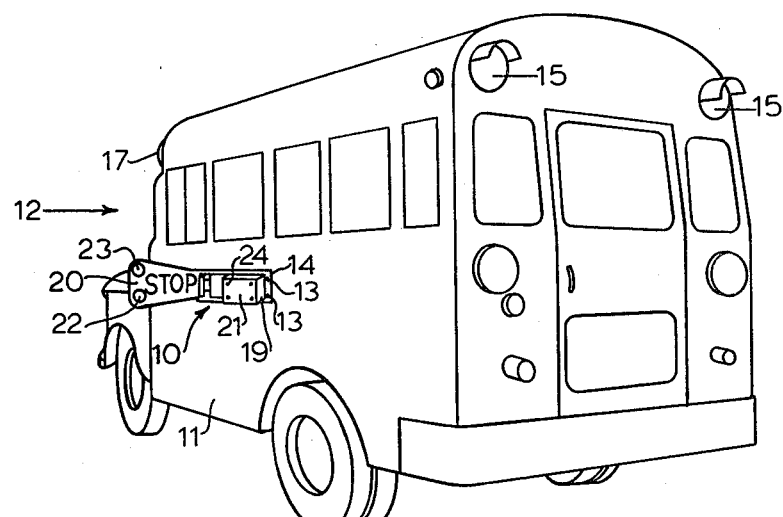
FIG. 1 is a pictorial view of a school bus with the invention stop sign unit partially recessed in the outside panel of the bus on the driver side thereof.

As illustrated in FIG. 1, the electrically-operated school bus stop sign unit 10 mounts partially recessed in the exterior side panel 11 of the body of school bus 12 and is held in place by screws 13 passing through flange 14 and securing into side panel 11. School bus stop sign unit 10 includes a sign 20 which, in FIG. 1, is shown deployed approximately 90 degrees from bus 12 in a position where sign 20 is readily visible to both following and oncoming traffic. School bus stop sign unit 10 is electrically tied to the sign lights 22, 23 and rear and front bus body lights 15 and 17 through the later described improved circuitry of the invention. In the deployed position, the invention unit 10, as later explained, causes lights 22, 23 to blink or flash along with lights 15 and 17 to alert drivers of nearby cars that bus 12 is either loading or unloading children.

Housing 19, of school bus stop sign unit 10 is partially recessed within side panel 11. A cover 21 of housing 19 is removably secured to housing 19 by screws 24 to facilitate repairs of component parts within housing 19. Housing 19 includes a top housing portion 25 and a bottom housing portion 26. Housing portions 25, 26 are secured together by welding or other suitable means. Top portion 25 has the outwardly extending peripheral, thin, flat, midpositioned flange 14 previously mentioned through which unit 10 is screwed into place. The school bus stop sign unit 10 can thus be recessed in the exterior side panel 11 so that the unit 10 is positioned between frame members (not shown) of bus 12.

Figure 2:
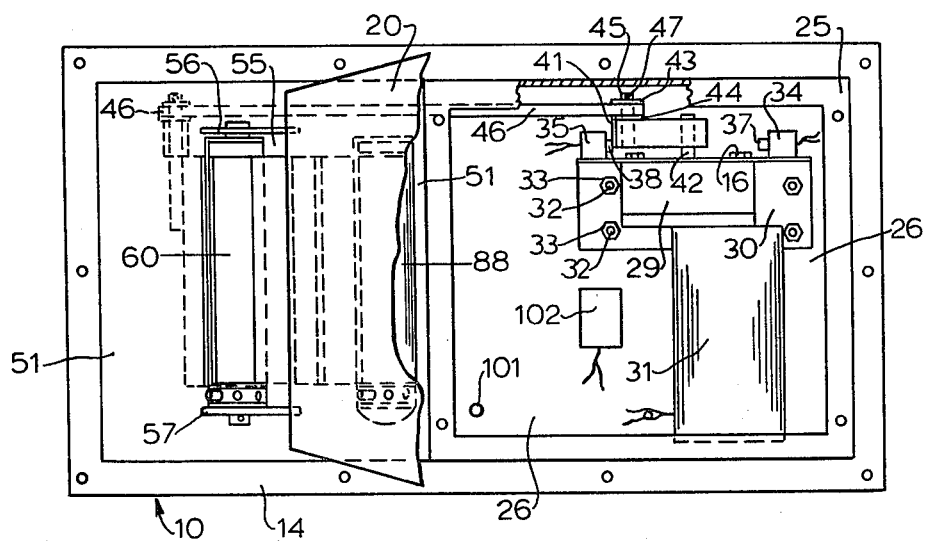
FIG. 2 is a plan view of the unit with the sign in a retracted position but with a large portion of the sign cut away, the cover removed, the wiring eliminated and illustrating the position of the internal mechanism in the retracted position.
Figure 3:
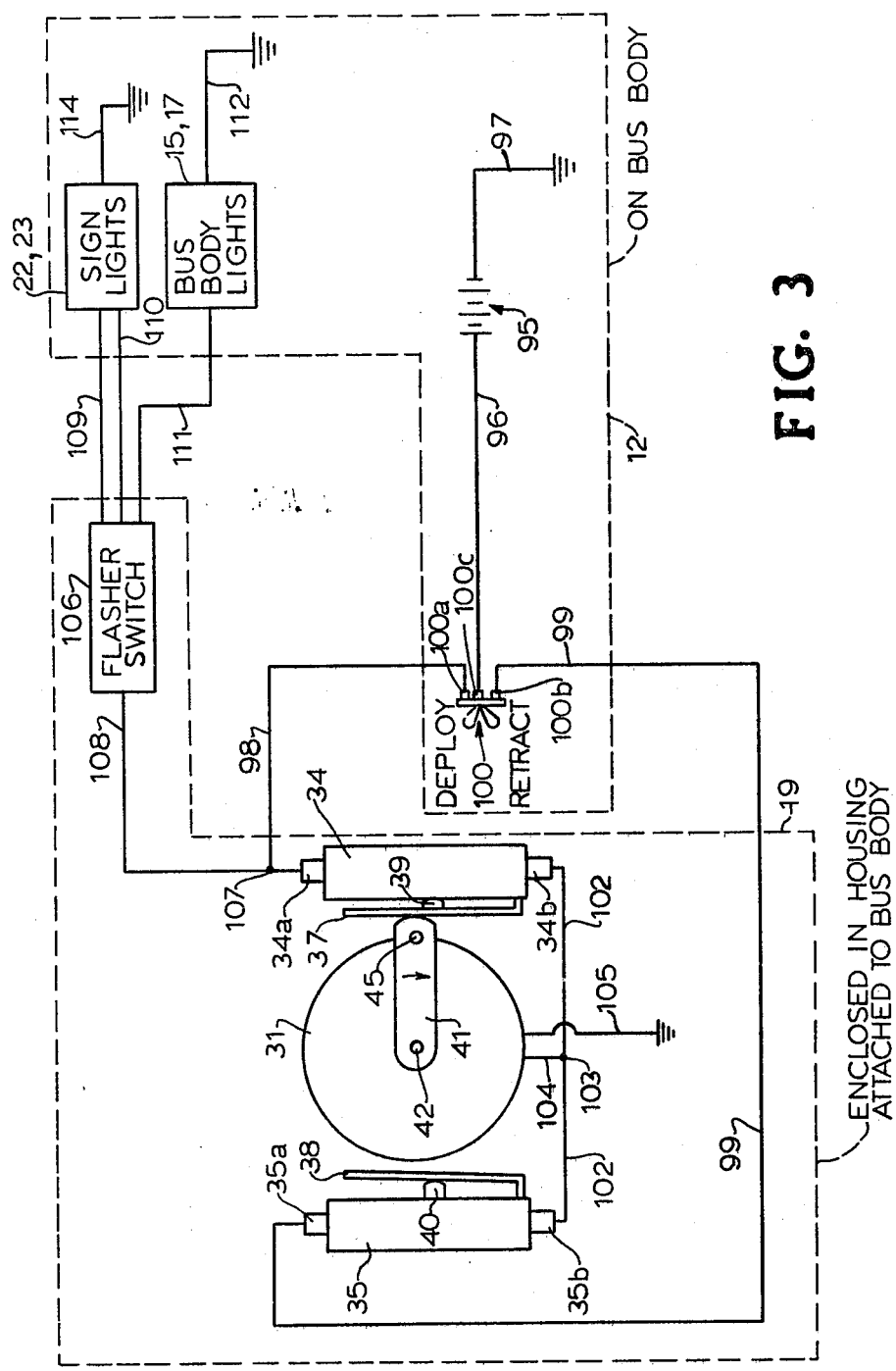
FIG. 3 is a circuit diagram showing the circuitry for deploying the sign and for retracting the sign and for flashing the bus body and sign lights.

An L-shaped bracket 30 bolts into bottom housing portion 26 and mounts on its upright portion a uni-directionally operating DC motor 31 and associated gear housing 29, by means of bolts 16, the gears of which, although not shown, are driven uni-directionally by the shaft of motor 31. Bolts 32 are integral with bottom portion 26 and mount bracket 30 locked in place by nuts 33. The end of housing 19 which contains bracket 30, motor 31 and gear housing 29 is substantially deeper than the opposite end and its related mechanism and allows uni-directional rotation of arm 41. Normally closed limit switches 34, 35 are also mounted on bracket 30, as seen in FIG. 2. Switches 34, 35 are fastened to bracket 30 by screws (not shown) which fasten into bracket 30. Sensing arms or springs 37, 38 are used to depress plungers 39, 40, respectively, as arm 41 contacts springs 37, 38 during the uni-directional travel of arm 41. Arm 41 is driven by shaft 42 of gear housing 29. Arm 41 rotates uni-directionally and makes a clockwise revolution as shown by the arrow in FIG. 3. A stub shaft 45 is rigidly fixed on the outer surface of arm 41 opposite and parallel to shaft 42 and extends beyond a sufficient distance to provide a mount. Connecting rod 46 mounts pivotally upon shaft 45, with washers 43, 44 on either side, and is held in place by cotter pin 47.

As previously mentioned but not shown, the rearwardly disposed end of housing 19 which contains motor 31 and gear housing 29 is considerably deeper than the opposite forward end. An opening 55 in wall 51 has adjacent thereto a pair of outwardly extending brackets 56, 57 rigidly secured to wall 51. Brackets 56, 57 receive pivotally therebetween a spring loaded cylinder 60 of the type conventionally used in two-way swinging doors and the like. Cylinder 60 is capable of being adjusted for spring tension.

Through appropriate linkage, thoroughly explained in U.S. Pat. No. 4,138,668, a second cylinder 88 is connected operatively with cylinder 60. From cylinder 88, also thoroughly explained in U.S. Pat. No. 4,138,688, appropriate linkage extends to and connects with sign 20. Sign 20 is deployed and retracted through operation of connecting rod 46 and cylinders 60 and 88.

Bus battery 95 is connected through wire 96 to a common central terminal 100c of a single pole, double throw manual switch 100 located within bus 12 and adjacent the driver and through wire 97 to ground. Terminal 100a on one side of switch 100 is labeled "DEPLOY" and through wire 98 connects to terminal 34a on one side of limit switch 34. Terminal 100b on the opposite side of switch 100 is labeled "RETRACT" and through wire 99 connects to terminal 35a on one side of limit switch 35. Wire 102 connects terminal 34b of the opposite side of switch 34 and terminal 35b of the opposite side of switch 35. Motor 31 through wire 104 and junction 103 connects to wire 102 and is grounded through wire 105. Switches 34-35 are normally closed.

Flasher switch 106 is connected through wire 108 and junction 107 to wire 98. Sign lights 22, 23 are in turn connected through wires 109, 110 to flasher switch 106 and to ground through wire 114. Also, bus body rear and front lights 15, 17 are connected to flasher switch 106 through wire 111 and are grounded through wire 112. Wires 98, 99 and 109-111 are conveniently bundled and pass into housing 19 through a single hole 101.

When switch 100 is in the off or "RETRACT" position, arm 41 rests in contact with spring 38 of limit switch 35 which maintains lights 15, 17, 22, 23 in a non-flashing condition. When switch 100 is in the on or "DEPLOYED" position, arm 41 rests in contact with spring 37 of limit switch 34 which turns lights 15, 17, 22, 23 to an on and flashing condition through flasher switch 106 which is conveniently located within housing 19 and can be replaced easily when the need arises. Sign 20 is normally in the retracted position. Bus lights 15, 17 and sign lights 22, 23 continue to flash as long as manual switch 100 is in the deploy position. In moving from one position to the other, motor 31 always operates in one direction. Thus, the need for bidirectional motor operation as in U.S. Pat. No. 4,138,668 has been eliminated.

After the children have been discharged from the bus, to retract sign 20, manual switch 100 is flipped to the retract position by the driver, which allows motor 31 to move arm 41 forward in the same direction as before to contact switch 35. When arm 41 reaches and contacts spring 38 of limit switch 35, motor 31 stops and sign 20 is held in the retracted position and lights 15, 17, 22, 23 are turned off.

As compared to the circuitry and operation of the school bus sign described in applicant's prior U.S. Pat. No. 4,138,668, it will be seen that motor 31 requires use of only two motor contacts, operates unidirectionally rather than bidirectionally and requires only a single wire running between the side of limit switches 34, 35 to which motor 31 is connected. Thus, many operating and manufacturing advantages are achieved in the wiring circuitry. Additionally, the linkage mechanism embodying connecting rod 46 lends itself to an improved smooth operation due to the unidirectional operation of the drive motor 31.

I claim:

1. A stop sign apparatus for a school bus, comprising in combination:
   (a) a housing having integrally joined walls to provide a box-like internal housing cavity and means enabling said housing to be releasably secured to an exterior school bus sidewall;
   (b) a unidirectional DC motor mounted and secured within said housing;
   (c) a sign mounting and linkage arrangement including switch actuator means positioned by said motor and linkage members connected to be actuated by said motor;
   (d) a sign member with warning lights mounted thereon and having an inner edge portion secured to said linkage members and adapted to being normally pivoted by said sign mounting and linkage arrangement between a retracted position in which it extends rearwardly and parallel to said bus sidewall and a deployed position in which it extends outwardly and perpendicular to said bus sidewall;
   (e) first and second normally closed limit switches mounted in opposed positions proximate said motor and switch actuation means, said first switch being arranged to be contacted by said switch actuator means when said sign is in said deployed position and said second switch being arranged to be contacted by said switch actuator means when said sign is in said retracted position;
   (f) a manual single pole double throw electric switch within said bus in a position accessible to the driver of said bus, said switch having a deploy and retract position corresponding to deployment and retraction of said sign member;
   (g) first circuit means including connecting wiring enabling said motor to be connected to the bus battery through said second limit switch in a first circuit configuration when said control switch is moved to its said deploy position with said actuator means being in contact with said first limit switch and in which first circuit configuration said linkage arrangement is actuated by said motor shaft rotating in a given direction to move said sign member to said deployed position whereupon said second limit switch is electrically opened by contact with said actuator means and said battery is disconnected from said motor and enabling said motor to be connected to the bus battery through said first limit switch in a second circuit configuration when said control switch is moved to its said retract position with said actuator means being in contact with said second limit switch and in which said second circuit configuration said linkage arrangement is actuated by said motor shaft rotating in the same said direction to move said sign member to said retracted position whereupon said first limit switch is electrically opened by contact with said actuator means and said battery is disconnected from said motor; and
   (h) second circuit means including a circuit interrupter, said first circuit means wiring being connected such that said sign warning lights are continuously energized by said battery through said circuit interrupter and independent of the electrical position of said first and second limit switches and electrically flash when and so long as said control switch is in its said deploy position.

2. A stop sign apparatus as claimed in claim 1 wherein said circuit interrupter is mounted in said housing.

* * * * *